Feb. 26, 1929.　　　　A. I. MARCUM　　　　1,703,536
VEHICLE DRIVE
Filed Aug. 4, 1923　　　4 Sheets-Sheet 1

INVENTOR.
ARTHUR I. MARCUM
HIS ATTORNEYS.

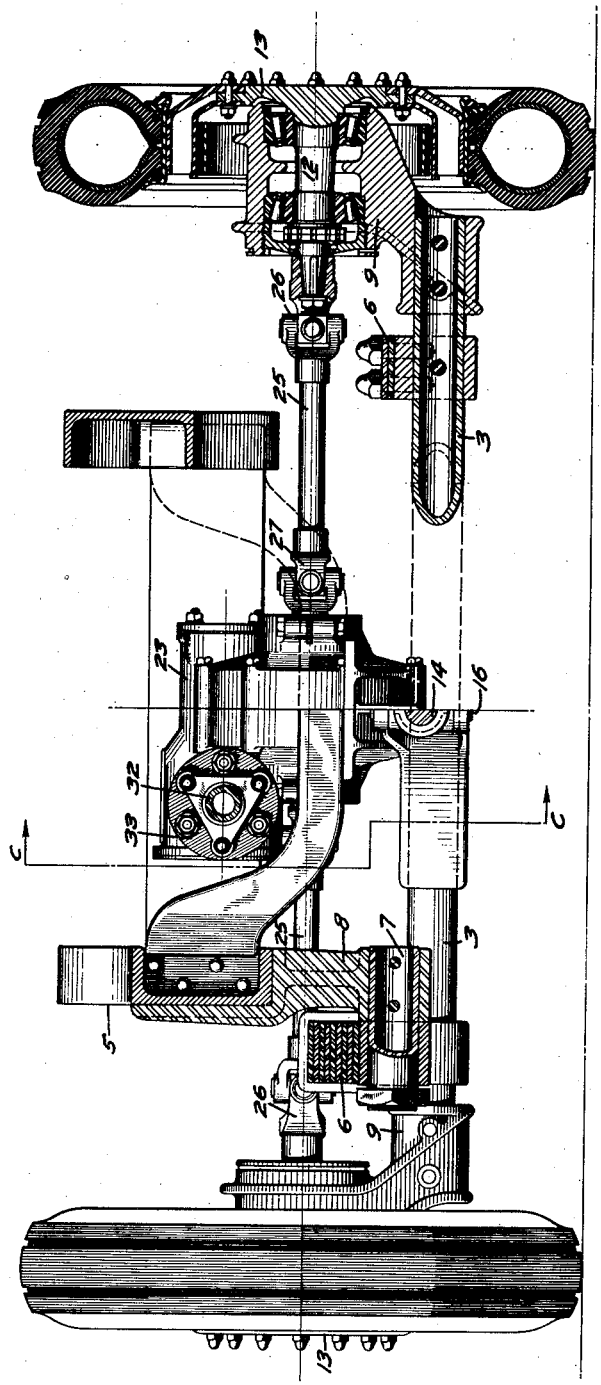

Feb. 26, 1929. 1,703,536
A. I. MARCUM
VEHICLE DRIVE
Filed Aug. 4, 1923 4 Sheets-Sheet 3
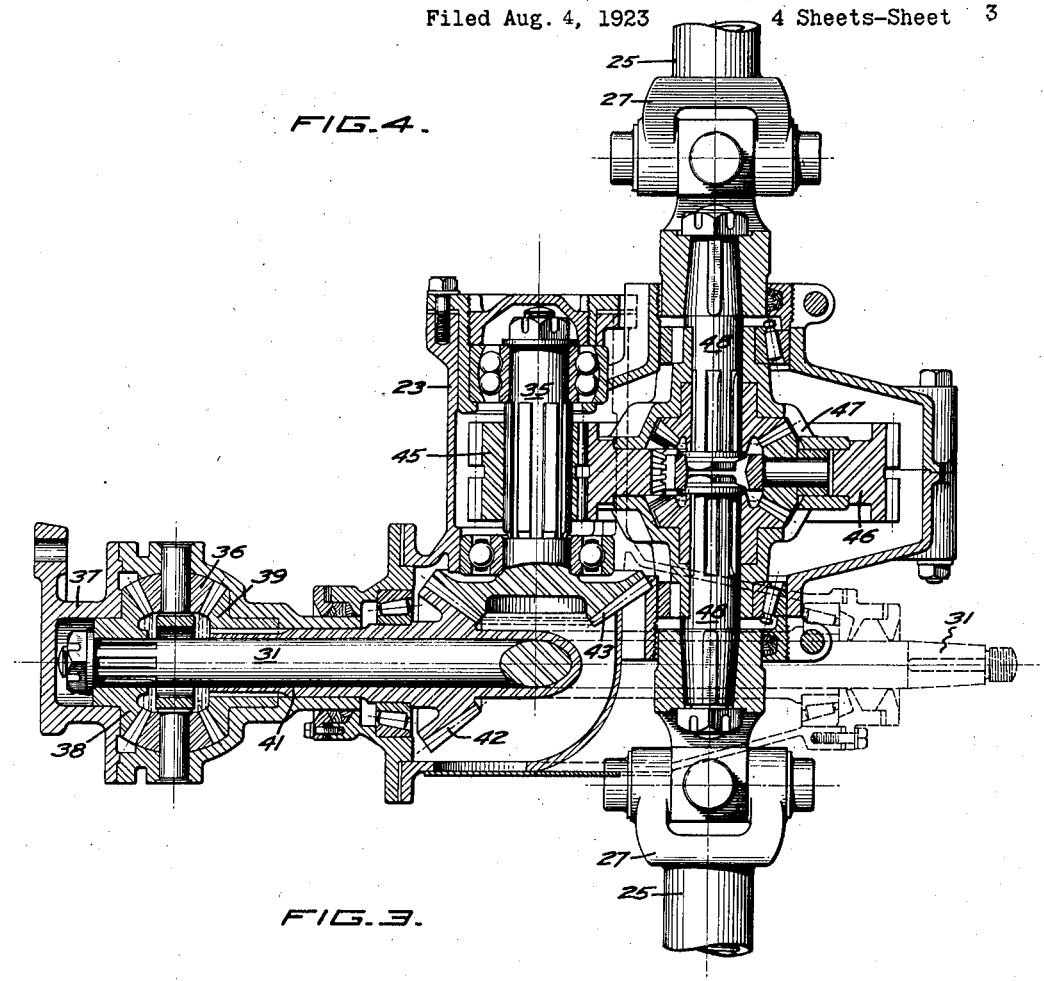
FIG. 4.
FIG. 3.
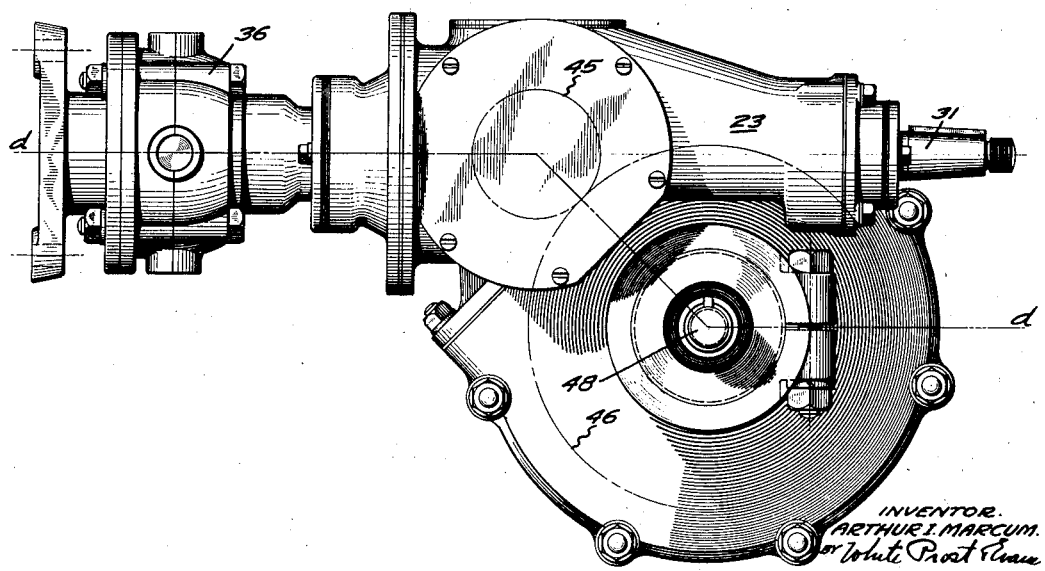
INVENTOR.
ARTHUR I. MARCUM.
HIS ATTORNEYS:

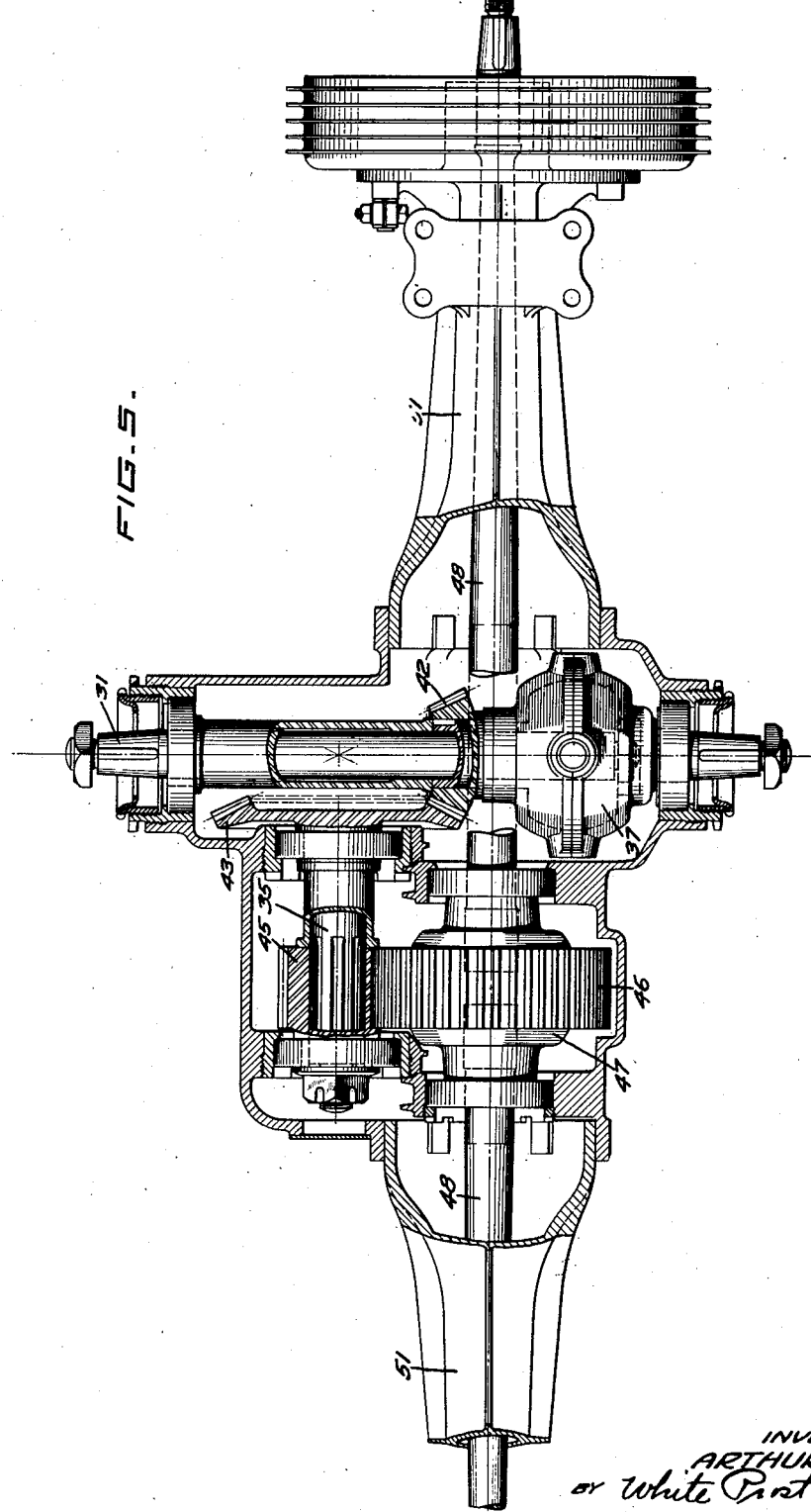

Patented Feb. 26, 1929.

1,703,536

UNITED STATES PATENT OFFICE.

ARTHUR I. MARCUM, OF OAKLAND, CALIFORNIA, ASSIGNOR TO EMORY WINSHIP, OF SAN FRANCISCO, CALIFORNIA.

VEHICLE DRIVE.

Application filed August 4, 1923. Serial No. 655,692.

The invention relates to a drive for tandem axles and is particularly adapted for use on road vehicles.

An object of the invention is to provide a tandem axle drive which possesses a minimum of unsprung weight.

Another object of the invention is to provide a tandem axle drive in which the two axles are differentially driven and in which the two wheels of each axle are differentially driven.

Another object of the invention is to provide a through drive speed reduction gear axle.

The invention possesses other advantageous features, some of which, with the foregoing, will be set forth at length in the following description, where I shall outline in full that form of my invention which I have selected for illustration in the drawings accompanying and forming part of the present specification. In said drawings I have shown one form of my invention, but it is to be understood that I do not limit myself to such form, since the invention, as set forth in the claims, may be embodied in a plurality of forms.

Referring to said drawings:

Figure 2 is a vertical transverse section of the rear end of a vehicle equipped with the drive of my invention, the left half of the figure being a section on the line a—a Figure 1 and the right half of the figure being a section on the line b—b Figure 1.

Figure 3 is a side elevation of the drive axle gear housing, forming part of my invention.

Figure 4 is a section through the drive axle gear housing taken on the line d—d Figure 3.

Figure 5 is a plan view of a beam axle, partly in section, showing the through drive and the speed reducing gear of my invention.

Figure 1:
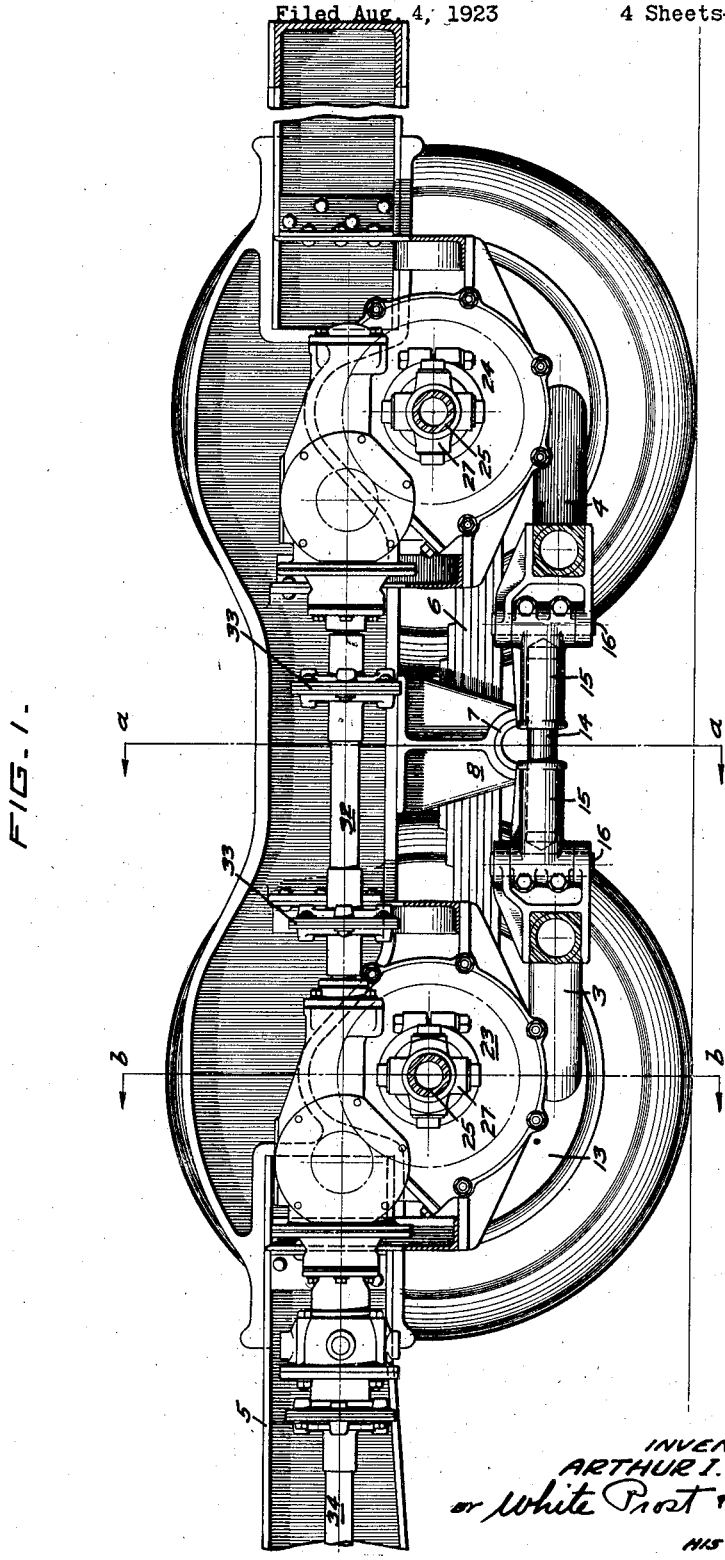
Figure 1 is a longitudinal vertical section through the rear end of a vehicle, equipped with the drive of my invention, the section being taken on the line c—c Figure 2.

My invention relates particularly, but not exclusively, to a tandem axle drive for road vehicles. A tandem axle comprises a pair of parallel axles both of which are driven. The two axles are connected together by springs or otherwise and act as a unit to drive the vehicle. My invention contemplates supporting the weight of the vehicle on load-carrying axles which support the frame of the vehicle. Springs are interposed between the load-carrying axles and the vehicle frame and the drive mechanism and drive axles are mounted on the frame so that the wheels and the load-carrying axles constitute the entire unsprung weight. This produces a much easier riding vehicle, a vehicle which is much more economical on tires and relieves the driving mechanisms of the vibrations to which they are subjected, when they are mounted on unsprung axles. The drive of my invention also contemplates a through drive whereby both axles are driven from one propeller shaft and the provision of a differential between the two axles and the provision of differentials between the two drive axles of each axle, so that all four wheels of the tandem axle are differentially driven.

The drive of my invention comprises the two load-carrying axles 3 and 4 on which the vehicle frame 5 is carried by the springs 6, the springs being preferably connected at their ends to the two axles and being fulcrumed intermediate their ends on stub shafts 7 carried by the bracket 8 secured to the vehicle frame. The load-carrying axles 3 and 4 are provided on their ends with hollow hubs 9 in which the wheel axles 12 are journalled. The wheels 13 are secured in any suitable manner to the wheel axles 12. The load-carrying axles are preferably made of heavy tubing and are bent towards each other adjacent their outer ends so that they will clear the drive mechanism housing as the flexure of the springs vary. The two load-carrying axles 3 and 4 are connected together by a telescopic torque bar 14 which prevents relative rotational movement of the axles, due to the application of power or the application of brakes. The bar 14 is telescoped in sockets 15 which are connected to the respective axles by vertical pivot pins 16 so that the axles are free to move in vertical planes, with respect to each other.

The driving gear mechanism for the wheels associated with the two axles 3 and 4 are enclosed in housings 23 and 24 which are directly mounted on the vehicle frame so that there is no relative movement of the housing with respect to the vehicle frame. Since the wheel axles 12 are movable vertically with respect to the frame and since the housings 23 and 24 are immovable with respect to the frame, flexible drive axles are provided for connecting the drive shaft of the drive mechanism with the wheel axle 12. These transversely disposed drive axles 25 are connected to the wheel axle 12 by universal joints 26 and are connected to the drive shaft of the driving mechanism by universal joints 27. This produces a flexible connection between the drive shaft and the wheel axle, permitting the housing to move with respect to the wheel axle, without interfering with the drive of the wheel axle.

The two housings 23 and 24 are similar with the exception that the front housing 23 is provided with a through shaft 31 for driving the rear axle. The through shaft 31 connects to the rear propeller shaft 32 which is preferably provided with flexible couplings 33 to accommodate distortions of the frame. The two housings are secured to the frame so that there is no relative movement of the housings with respect to each other thereby eliminating the use of universal joints and slip-joints in the propeller shaft between the two housings.

Power is supplied to the axle drive mechanism by the motor driven propeller shaft 34. Arranged between the through drive shaft 31 and the driven shaft 35 of the front axle is a differential gear 36 which permits differential rotation of these two shafts. The propeller shaft 34 is connected to the differential housing 37 and one of the differentially driven gears 38 is connected to the through shaft 31 and the other differentially driven gear 39 is secured to the sleeve 41 with which the driving pinion 42 of the front axle is integral. The pinion 42 meshes with the master gear 43 which is formed integral with the driven shaft 35 and the diameter of the pinion 42 is less than the diameter of the gear 43 so that a reduction in speed occurs between these two gears. Secured to the driven shaft 35 is a gear 45 which is preferably of the herringbone type and this gear meshes with the ring gear 46 of the differential 47 which is interposed between the two axle drive shafts 48. The two axle drive shafts are therefore differentially driven and since the two driven shafts in the two axles are differentially driven with respect to each other, all four wheels of the tandem drive are differentially driven with respect to each other.

In the housing 23 associated with the front axle, the through drive shaft 31 projects from the rear of the housing where it is connected to the propeller shaft 32, but in the rear axle housing 24, no through shaft is necessary and consequently the construction of the rear axle mechanism is modified to that extent. The gear 45 is of less diameter than the ring gear 46 of the differential mechanism, so that a reduction in speed occurs between these two gears. There is thus provided a double reduction gear through drive axle in which the through drive shaft and the driven shaft are differentially driven and in which the two axle drive shafts are differentially driven. Substantially all of the operative mechanism of the vehicle is supported on springs, so that it is not subjected to road shocks thereby prolonging the life of the mechanism. Further in a tandem axle the vertical distance between the centers of the two axles, frequently varies considerably as the vehicle is passing over an uneven road, thereby causing great changes of position and inclination of the propeller shaft 32 connecting the two axles. By securing the two axle drive mechanism housings to the vehicle frame, there is no relative movement between these parts and the objectionable features encountered in prior construction are thereby eliminated. The movement of the load-carrying axles with respect to the frame is less than the movement of the axles with respect to each other, so that the flexible drive axles 25 are not subjected to the same inclination as the through shaft and consequently the difficulties of drives encountered in the prior constructions are not encountered in the present construction. There is therefore provided a very efficient tandem drive in which the unsprung weight is reduced to a minimum and in which the difficulties due to the relative movement of the axles are substantially obviated.

In Figure 5 I have shown my invention embodied in a through drive beam axle in which the axle housing 51 provides the beam or load-carrying axle. The differential gear arrangement and the speed reducing gear assembly are the same as is shown in Figure 4. The drive axles 48 are rigid and extend within the housing 51 from the differential 47 to the wheels, instead of being connected to flexible drive shafts as in Figure 4.

I claim:

1. In a vehicle, a pair of substantially parallel load carrying axles arranged adjacent one end of the vehicle; a pair of ground engaging wheels supporting each of said axles, a plurality of leaf springs connecting said axles together and with the ends of said springs supported from said axles; a vehicle frame supported on said springs; a plurality of differential drive mechanisms supported on said frame one individual to each of said pairs of wheels; flexible drive connections between each of said differential mechanisms and the wheels individual thereto, and a common driving means for said differential mechanisms.

2. A vehicle comprising a plurality of pairs of ground engaging wheels arranged adjacent one end of said vehicle; a frame; means for supporting said frame from said wheels comprising resilient connections interconnecting said wheels and said frame; a differential drive mechanism individual to each of said pairs of wheels supported on said frame; flexible drive connections from said differential mechanisms to the pair of wheels individual thereto; and a common differentiated driving mechanism for said differential mechanisms supported from said frame.

3. A vehicle comprising a frame; a plurality of differential mechanisms supported on said frame; a pair of wheels individual to each of said differential mechanisms; load equalizing means comprising resilient connections interconnecting said wheels and said frame; flexible drive connections between each of said differential mechanisms and the wheels individual thereto; and a common driving means for said differential mechanisms.

4. The combination with a vehicle frame, of a pair of load-carrying axles provided on their ends with bearings, wheel axles journalled in said bearings, wheels secured to said axles, housings secured to the frame, double reduction speed gearing arranged in each housing, propeller shafts for driving said reduction gearings and flexible drive axles connecting the speed reduction gearings to the four wheel axles.

5. A vehicle comprising a frame; a pair of differential wheel drive mechanisms supported from said frame in fixed relation with respect to each other, each differential comprising a pair of driven gears; common drive means for said differential mechanisms supported on said frame; a plurality of leaf springs upon which said frame is mounted; a pair of substantially parallel load carrying axles from which the ends of said springs are supported; a pair of journals secured to the ends of said axles with the centers thereof in normal substantial alignment with the axes of rotation of said driven differential gears; a plurality of ground wheels with central drive spindles mounted in said journals; and flexible drive connections from said driven differential gears to said drive spindles; said load carrying axles being offset to clear said differential drive mechanisms.

6. In a motor vehicle, tandem load supporting axles, each secured to a pair of wheels below the axis of rotation of said wheels, a frame supported yieldingly on said axles, a differential for each pair of wheels carried by said frame, a propeller shaft carried by the frame, means coupling said shaft to said differentials, said last named means being carried by the frame, and flexible shafts for coupling said wheels and differentials, said flexible shafts normally extending substantially at right angles to the planes of rotation and in substantial alignment with the axis of rotation of the wheels.

7. In a motor vehicle, comprising a frame, a propeller shaft carried thereby, a pair of differentials carried thereby, means for differentially driving said differentials from said propeller shaft, said last named means being secured to the frame, a pair of load supporting axles, a pair of wheels for each differential secured to each of said axles, means yieldably supporting said frame from said axles, and flexible shafts connecting each wheel to a differential, said last named shafts being normally substantially horizontal and having their axes normally substantially in alignment with the axes of rotation of said wheels.

8. A multi-wheel road vehicle comprising a frame, a pair of load supporting axles arranged adjacent one end of said frame, a pair of wheels for each axle provided with a centrally arranged driving spindle, means to connect said wheels and axles so that said axles lie substantially below said spindles, springs yieldably supporting said frame from said axles, a drive shaft on said frame, a differential for each pair of wheels supported on said frame, a third differential supported on said frame and operatively connected to said first named differentials, and to said drive shaft, and flexible shafts normally extending in substantial alignment with said spindles and operatively connected to said first named differentials.

9. A drive for a vehicle embodying a pair of driven axles, comprising a drive shaft, a housing for one of said axles, a differential journalled in said housing and operatively connected to said drive shaft, a through shaft to drive the other of said axles, live axle sections in said housing, a differential between said axle sections, said differential including a ring gear disposed laterally of said drive and through shafts, a countershaft disposed laterally of said drive and through shafts, a gear secured to said countershaft and meshing with said ring gear, and mechanism between said first named differential and said countershaft and through drive shaft to cause said last named shafts to be differentially driven thereby.

In testimony whereof, I have hereunto set my hand.

ARTHUR I. MARCUM.